United States Patent
Jain et al.

(10) Patent No.: US 9,503,325 B2
(45) Date of Patent: Nov. 22, 2016

(54) DYNAMIC VIRTUAL PORT INSTANTIATION FOR SCALABLE MULTITENANT NETWORK

(71) Applicant: Cisco Technology, Inc., San Jose, CA (US)

(72) Inventors: Vipin Jain, San Jose, CA (US); Suran Saminda de Silva, Saratoga, CA (US); Chiajen Tsai, Cupertino, CA (US); Debashis Patnala Rao, Cupertino, CA (US); Yibin Yang, San Jose, CA (US); Palathingal Frank, Pleasanton, CA (US); Shyam Kapadia, Santa Clara, CA (US); Vijay Gopal Krishnan, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 14/080,916

(22) Filed: Nov. 15, 2013

(65) Prior Publication Data

US 2015/0139035 A1 May 21, 2015

(51) Int. Cl.
*H04L 12/24* (2006.01)
*H04L 12/46* (2006.01)

(52) U.S. Cl.
CPC ......... *H04L 41/0816* (2013.01); *H04L 12/467* (2013.01); *H04L 12/4675* (2013.01)

(58) Field of Classification Search
None
See application file for complete search history.

(56) References Cited

U.S. PATENT DOCUMENTS

| 7,836,332 | B2 | 11/2010 | Hara et al. |
| 7,957,325 | B2 * | 6/2011 | Rose et al. .................... 370/255 |
| 8,037,344 | B2 | 10/2011 | Hara et al. |
| 2006/0023724 | A1 * | 2/2006 | Na et al. ................... 370/395.53 |
| 2006/0072594 | A1 * | 4/2006 | Swamy ........................ 370/409 |
| 2010/0100878 | A1 | 4/2010 | Otani |
| 2012/0093034 | A1 * | 4/2012 | Kamath et al. ............... 370/255 |
| 2013/0136123 | A1 * | 5/2013 | Ge ....................... H04L 12/4645 370/390 |
| 2013/0177022 | A1 * | 7/2013 | Caffrey et al. ........... 370/395.53 |
| 2013/0242983 | A1 * | 9/2013 | Tripathi .................. H04L 49/25 370/355 |
| 2014/0101302 | A1 * | 4/2014 | Yang et al. .................... 709/224 |

* cited by examiner

*Primary Examiner* — Hassan Phillips
*Assistant Examiner* — Saba Tsegaye
(74) *Attorney, Agent, or Firm* — Edell, Shapiro & Finnan, LLC

(57) ABSTRACT

A leaf switch of a switch fabric includes multiple ports to connect with respective ones of multiple servers. Virtual local area networks (VLANs) are configured on the leaf switch. Dynamic creation of virtual ports is enabled on the leaf switch for at least one of the VLANs on an as needed basis. The leaf switch receives from a particular server connected to a corresponding one of the ports a notification message that a virtual machine is hosted on the particular server. Responsive to the notification message, the leaf switch dynamically creates a virtual port that associates the corresponding one of the ports with the at least one of the VLANs.

25 Claims, 8 Drawing Sheets

DYNAMIC VIRTUAL PORT INSTANTIATION FOR SCALABLE MULTITENANT NETWORK

TECHNICAL FIELD

The present disclosure relates to virtual ports in a multitenant network.

BACKGROUND

A spine-leaf network includes edge or leaf switches connected with servers over trunk ports. The servers are configured to host virtual machines that may be part of one or more virtual area networks (VLANs) configured on the leaf switches. The servers and virtual machines hosted thereon may participate in VLAN communication through virtual ports created on the leaf switches.

A virtual port associates a trunk port with a VLAN. Conventionally, a leaf switch creates virtual ports for all the configured VLANs on each trunk port by default even if the vlans are not used by the server. This is wasteful of leaf switch resources and results in needless VLAN traffic flooding to all trunk ports and virtual ports.

DESCRIPTION OF EXAMPLE EMBODIMENTS

Overview

A technique is presented herein to dynamically create virtual ports on a network switch in a multitenant network. The switch may be connected to other switches through a switch fabric. The switch includes multiple ports to connect with respective ones of multiple servers to host virtual machines. Multiple virtual local area networks (VLANs) are configured on the switch. The switch enables dynamic creation of virtual ports for at least one of the VLANs on an as needed basis, where a virtual port associates a port with a VLAN. The switch receives from a particular server connected to a corresponding one of the ports a notification message that a virtual machine is hosted on the particular server. Responsive to the notification message, the switch dynamically creates a virtual port that associates the corresponding one of the ports with the at least one of the VLANs.

Example Embodiments

Figure 1:
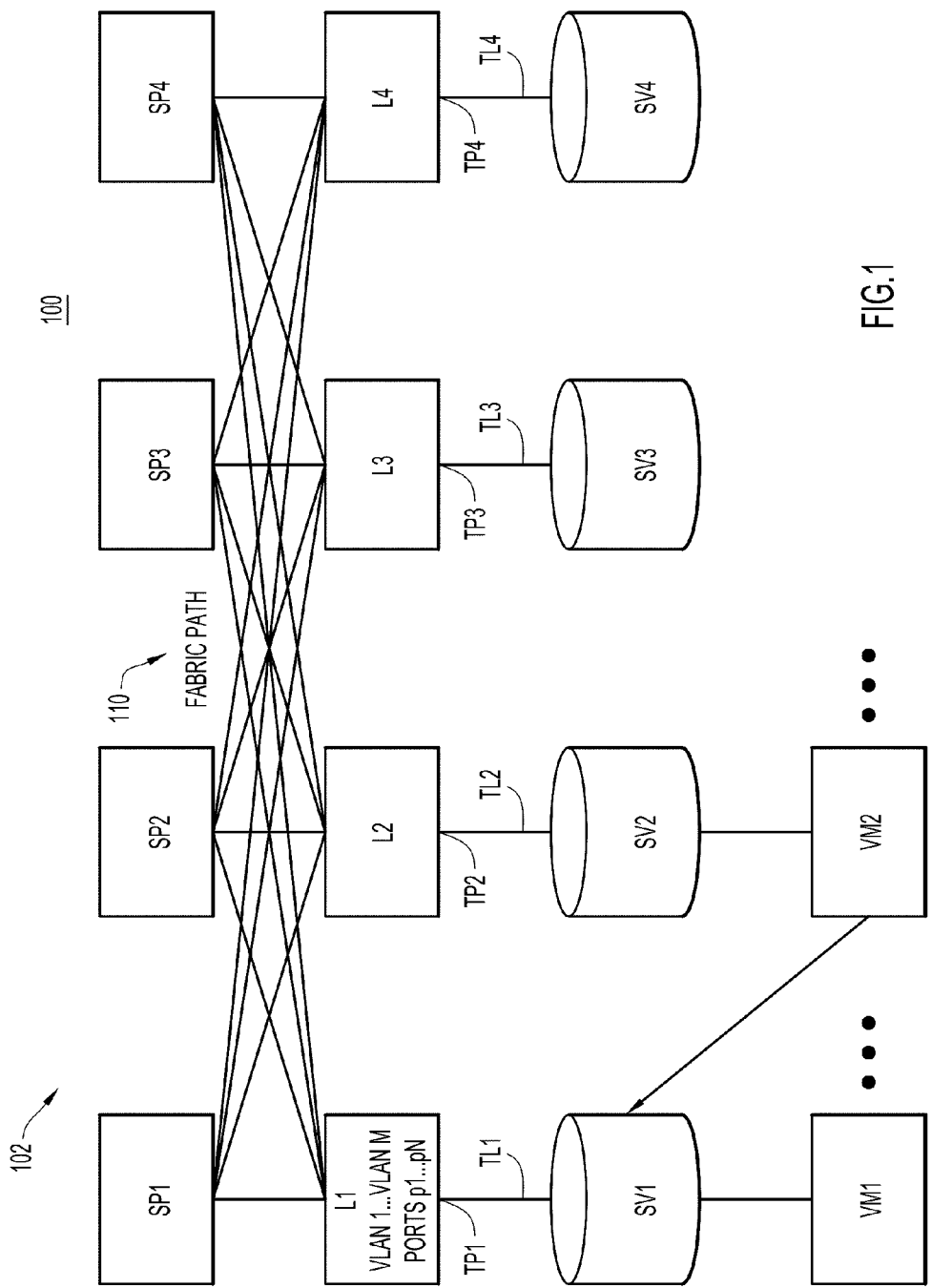
FIG. 1 is a block diagram of an example network environment in which virtual port instantiation may be implemented in accordance with techniques presented herein.

Referring first to FIG. 1, there is shown a block diagram of an example network environment 100 in which virtual port instantiation may be implemented in accordance with techniques provided herein. Network environment 100 includes a spine-leaf cluster network topology 102 coupled with multiple servers SV1-SV4. Each of servers SV1-SV4 may host multiple virtual machines (VMs), such as virtual machines VM1 and VM2.

Network topology 102 includes multiple spine switches SP1-SP4 and multiple leaf switches L1-L4 connected to the spine switches by a network fabric 110, such as, but not limited to, FabricPath technology by Cisco Systems, Inc. Spine SP1-SP4 and leaf switches L1-L4 are shown to be 2-tier fat tree or Clos, with each leaf switch connected to each spine switch and each spine switch connected to each leaf switch via network fabric 110. Together, spine and leaf switches SP1-SP4 and L1-L4 form the backbone of a scalable multipath data center fabric. Spine and leaf switches SP1-SP4 and L1-L4 may each support functionality as defined by Open Systems Interconnection (OSI) model Layer 2 or Layer 3, and include switching and/or routing capabilities. It should also be appreciated that the topology in FIG. 1 is shown merely as an example, and any number of combinations of physical servers, leaf switches, spine switches, and virtual machines may be present in network environment 100.

Leaf switches L1-L4 include respective trunk ports TP1-TP4 to connect with respective servers SV1-SV4 over respective trunk links TL1-TL4. Although only one trunk port is depicted on each leaf switch in FIG. 1, in practice each leaf switch includes multiple, N, trunk ports (also referred to as "ports") identified as ports p1 . . . pN that may operate in accordance with IEEE 802.1Q, for example. Servers SV1-SV4 may each host virtual machines, such as virtual machines VM1 and VM2. Each virtual machine may have equivalent functionality to a physical machine and reside on any of servers SV1-SV4. The server on which the virtual machine resides is referred to as a host server.

Network environment 100 supports several actions with respect to virtual machines, including: creating a virtual machine on a host server, e.g., creating virtual machine VM1 on server SV1; migrating a virtual machine to a different host server, e.g., migrating virtual machine VM2 from server SV2 to server SV1; and terminating the virtual machine, e.g., VM1 or VM2, on the host server based on the characteristics and needs of network environment 100. To support such actions, for example, host server SV1 is provisioned with compute, storage, and network resources for the resident virtual machine VM1 or virtual machine VM2. Also, leaf edge L1 is provisioned with network-related parameters necessary to implement a virtual network within which virtual machine VM1 or virtual machine VM2 will operate through that leaf edge. Server SV1 and leaf edge L1 may use a signaling protocol, referred to as a "first hop" protocol, to provision/configure the leaf switch with necessary network-related parameters through an exchange of type-length-value (TLV) protocol elements or messages. An example first hop signaling protocol is the Virtual Station Interface (VSI) Discovery and Configuration Protocol (VDP) defined in IEEE 802.1Qbg. Embodiments described herein may conform generally to VDP, unless new features are being added herein. It is to be understood that other similar network protocols are possible.

Virtual machines, e.g., virtual machines VM1 and VM2, and servers SV1-SV4 may each participate in one or more virtual local area networks (VLANs) configured in network fabric 110. To this end, Leaf switches L1-L4 may each be configured to support multiple, M, VLANs having VLAN identifiers (VLAN IDs) VLAN 1 ... VLAN M, where M is in the range of 1 to 4094 (4K). In addition, leaf switches L1-L4 are each configured to support virtual ports (VPs) that represent a logical association between (i) the ports of the leaf switch to which a server is connected, and (ii) the VLANs configured on the leaf switch. More specifically, a virtual port associates or pairs a port identifier with a VLAN identifier, such as port p1 with VLAN 3, denoted as virtual port <p1, VLAN 3>. Thus, servers SV1-SV4 are said to connect with leaf switches L1-S4 through respective virtual ports that associate switch ports with VLANs configured on the leaf switches. Because a trunk port on a leaf switch may be associated with all of the VLANs configured on a leaf switch, the number of possible virtual ports in the leaf switch is proportional to the product of the number of ports and the number of VLANs. Thus, a given switch may be configured to support many thousands of virtual ports which places a huge processing load A leaf switch and a server connected thereto may exchange data traffic through a virtual port. For example, the data traffic may be routed to and from a virtual machine hosted on the server and that is associated with a VLAN on the leaf switch. In addition, the leaf switch and the server may implement a VLAN protocol over the virtual port, such as the Per-VLAN Spanning Tree (PVST) protocol by Cisco Systems, Inc., which exchanges bridge protocol data units (BPDU5). This adds to the processing load on the switch.

Network fabric 110 supports multitenancy in the form of multiple virtual networks, each identified by its own Virtual Network ID (VNID). VLANs configured on each leaf switch may be mapped to individual ones of the virtual networks in database tables of the leaf switch, described below.

In accordance with techniques provided herein, virtual ports in leaf switches L1-L4 may be instantiated or created in either of two modes, referred to as (i) static creation of virtual ports in which virtual ports are created statically whether needed or not, and (ii) dynamic creation of virtual ports in which virtual ports are created dynamically on an as needed basis. The terms "instantiation" and "creation" and their respective derivatives are synonymous and used interchangeably herein. "Static creation of virtual ports" and "dynamic creation of virtual ports" are also respectively referred to herein as "static virtual port creation" and "dynamic virtual port creation."

Static creation of virtual ports creates a full set of virtual ports on a leaf switch across all VLANs that are configured on the leaf switch a priori without accounting for whether the created virtual ports are actually needed for connectivity with a server and/or virtual machine. In an example, a leaf switch configured with 4 k VLANs creates 4 k virtual ports for each of the ports available on the leaf switch that are linked up, even though many of the VLANs may not be used by the server or virtual machine. While this approach to virtual port creation is relatively simple, it can exhaust available resources in the leaf switch and may result in an unnecessary flooding of VLAN traffic across all of the virtual ports.

In contrast, dynamic creation of virtual ports creates virtual ports for VLANs configured on the leaf switch only when needed, i.e., on an as needed basis, for example, when a virtual machine is resident on a server to which the leaf switch is connected and a virtual machine requires a virtual port connection. In a high-level example, leaf switch L1 initially disables or suppresses static creation of virtual ports to prevent a priori creation thereof, and enables dynamic creation of virtual ports for VLANs configured on the leaf switch. Server SV1 notifies leaf switch L1 through a first hop protocol message that virtual machine VM1 is hosted on the server belonging to a given virtual network identified by the VNID and requires access to a given VLAN. In response, leaf switch L1 dynamically creates a virtual port that associates port TP1 with the relevant VLAN. The signaling exchanges between leaf switch L1 and server SV1 to instantiate/create the virtual port dynamically may include VDP TLVs. Dynamic creation of virtual ports on an as needed basis advantageously conserves resources in the leaf switch and avoids unnecessary flooding of traffic across VLANs and ports.

Figure 2:
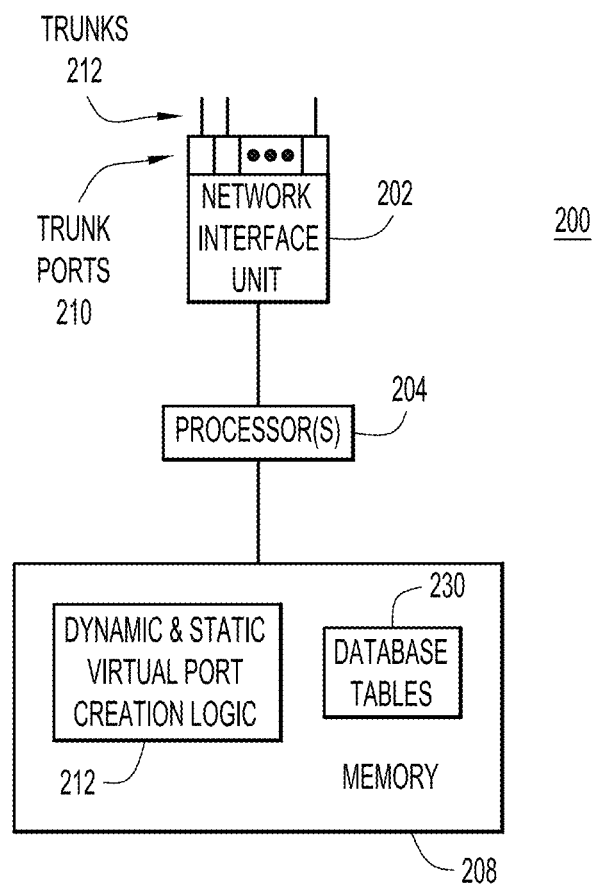
FIG. 2 is a block diagram of an example computer system implemented in a leaf switch of FIG. 1 and configured to perform operations related to dynamic and static creation of virtual ports.

With reference to FIG. 2, there is shown an example block diagram of a system 200 implemented in a leaf switch and configured to perform operations related to dynamic and static creation of virtual ports, as described herein. There are numerous possible configurations for system 200 and FIG. 2 is meant to be an example. System 200 includes a network interface unit 202, a processor 204, and memory 208. The network interface (I/F) unit 202 is, for example, an Ethernet card device configured with physical ports, such as trunk ports 210, that allows computer system 200 to communicate over a network, e.g., a wired (Ethernet) network, including trunk links (or trunks) 212. Network I/F unit 202 may also include wireless connection capability. Processor 204 is a microcontroller or microprocessor, for example, configured to execute software instructions stored in the memory 208.

The memory 208 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 208 may comprise one or more computer readable storage media (e.g., a memory device) encoded with software comprising computer executable instructions and when the software is executed (by processor 204) it is operable to perform the operations described herein. For example, memory 208 stores or is encoded with Dynamic and Static Virtual Port Creation logic 212 to perform dynamic and static creation of virtual ports and implement necessary signaling protocols between the leaf switch and a server. In addition, the memory 208 stores database (DB) tables 230 (also referred to simply as database 230) that includes information used by logic 212, such as VLAN tables, VLAN to VNID mappings, virtual port associations, i.e., <port ID, VLAN ID), signaling protocol, e.g., first hop, message formats, etc.

Figure 3:
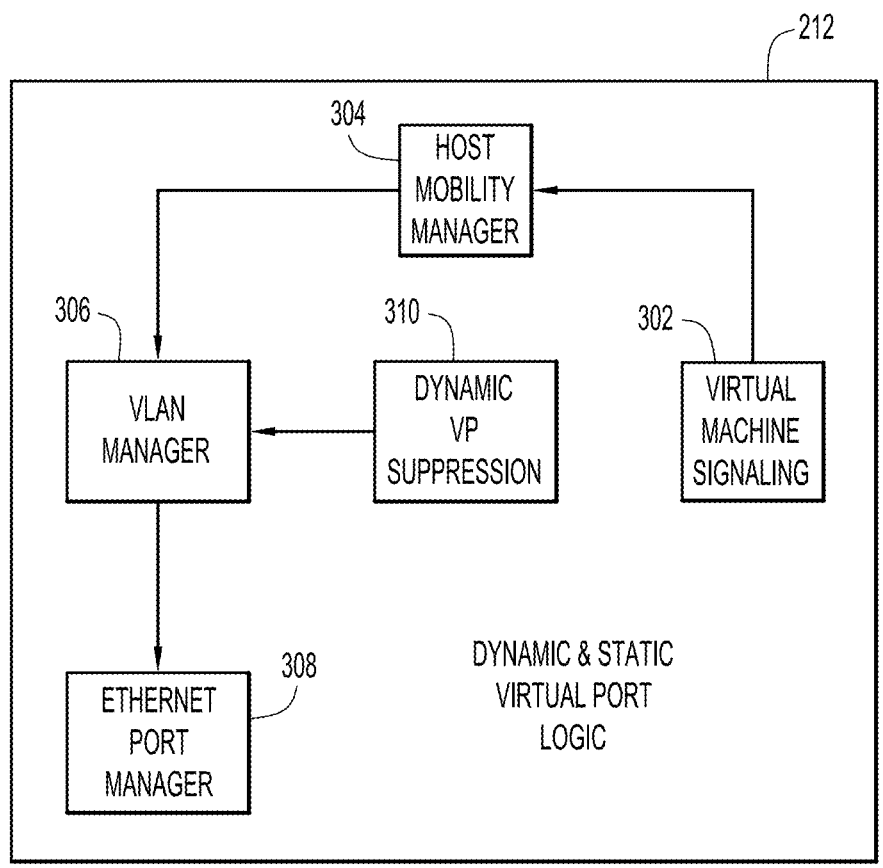
FIG. 3 is a block diagram of processing modules expanding on Dynamic and Static Virtual Port Creation logic in the computer system shown in FIG. 2.

With reference to FIG. 3, there is shown a block diagram expanding on Dynamic and Static Virtual Port Creation logic 212. Logic 212 includes a Virtual Machine Signaling module 302, a Host Mobility Manager module 304, a VLAN Manager module 306, an Ethernet Port Manager module 308, and a Dynamic Virtual Port Suppression module 310. Virtual Machine Signaling module 302 and Dynamic Virtual Port Suppression module 310 of a given leaf switch, e.g., leaf switch L1, communicate with their peer instances on a server, e.g., server SV1, connected to the leaf switch through a protocol, such as VDP. For example, server SV1 may choose to notify leaf switch L1 whether to enable or disable/suppress dynamic virtual port creation using the protocol for a list (one or more) of VNIDs. If dynamic virtual port creation is suppressed, Dynamic Virtual Port Suppression module 310 will inform VLAN Manager module 306 to create virtual ports on leaf switch ports connected with server SV1 statically for all VLANs configured on the leaf switch, regardless of connectivity between the ports and servers. This is a pre-provisioning step that speeds up the VM bring-up and data flow.

Dynamic virtual creation may not be suppressed, i.e., may be enabled. In this case, when a virtual machine, e.g., virtual machine VM1 or VM2, moves to server SV1, the server notifies leaf switch L1 through the protocol. Then Virtual Machine Signaling module 302 requests a VLAN on the port connected with server SV1 for the virtual machine through Host Mobility Manager module 304, based on an identifier, such as a VNID. In turn, VLAN Manager module 306 notifies Ethernet Port Manager module 302 to create a virtual port, if such a virtual port has not been created yet.

Figure 4:
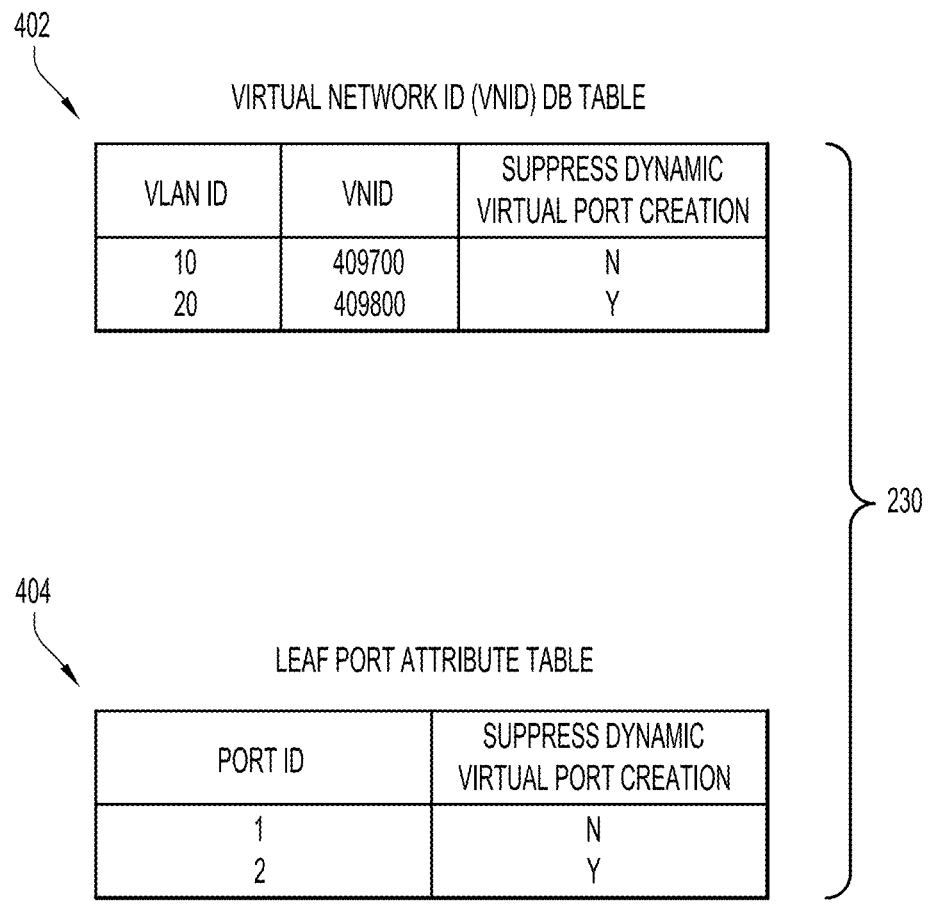
FIG. 4 is an illustration of example database tables from a database depicted in FIG. 2, including a Virtual Network identifier (ID) (VNID) table and a Leaf Port Attribute table.

With reference to FIG. 4, there is shown example tables of database 230, including a VNID DB table 402 and a Leaf Port Attribute table 404. Table 402 associates VLANs by VLAN ID with corresponding VNIDs and a Yes/No (Y/N) flag to indicate whether dynamic virtual port creation is to be either suppressed or enabled for the corresponding VLAN. Given a VNID, the corresponding VLAN may be determined based on table 402. Also, table 402 permits enabling/disabling of dynamic virtual port creation on a per VLAN basis.

Table 404 associates ports on a leaf switch by port ID with a corresponding Y/N flag to indicate whether dynamic virtual port creation is to be either suppressed or enabled for the corresponding port. Accordingly, table 404 permits enabling/disabling of dynamic virtual port creation on a per port basis. If disabled, this setting overrides the messages from the server. Together, tables 402 and 404 signal to logic 212 enabling/disabling of dynamic virtual port creation on a per VLAN and a per port basis.

Figure 5A:
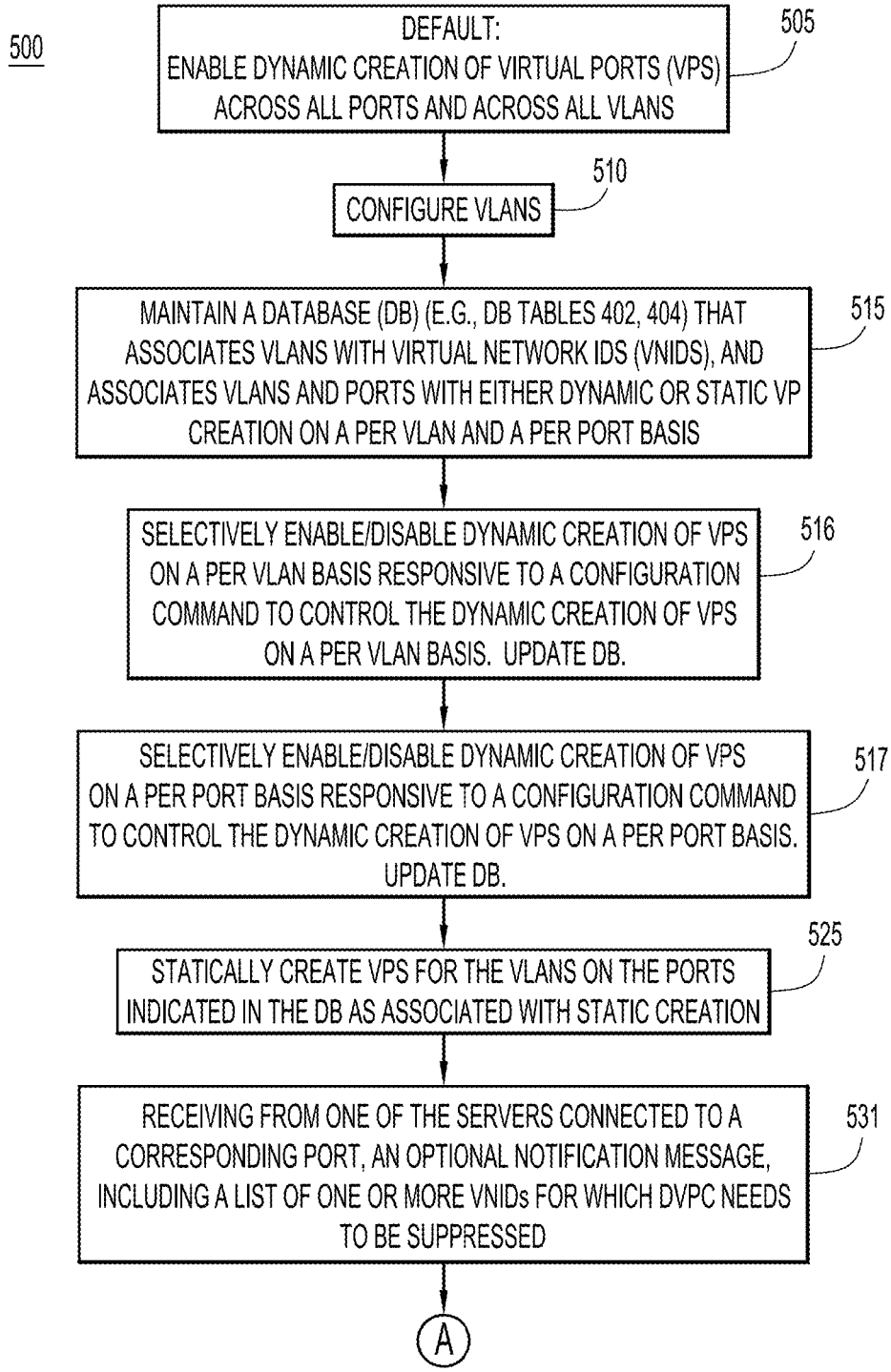
FIGS. 5A and 5B collectively represent a flowchart of an example method of dynamically and statically creating virtual ports in a leaf switch.
Figure 5B:
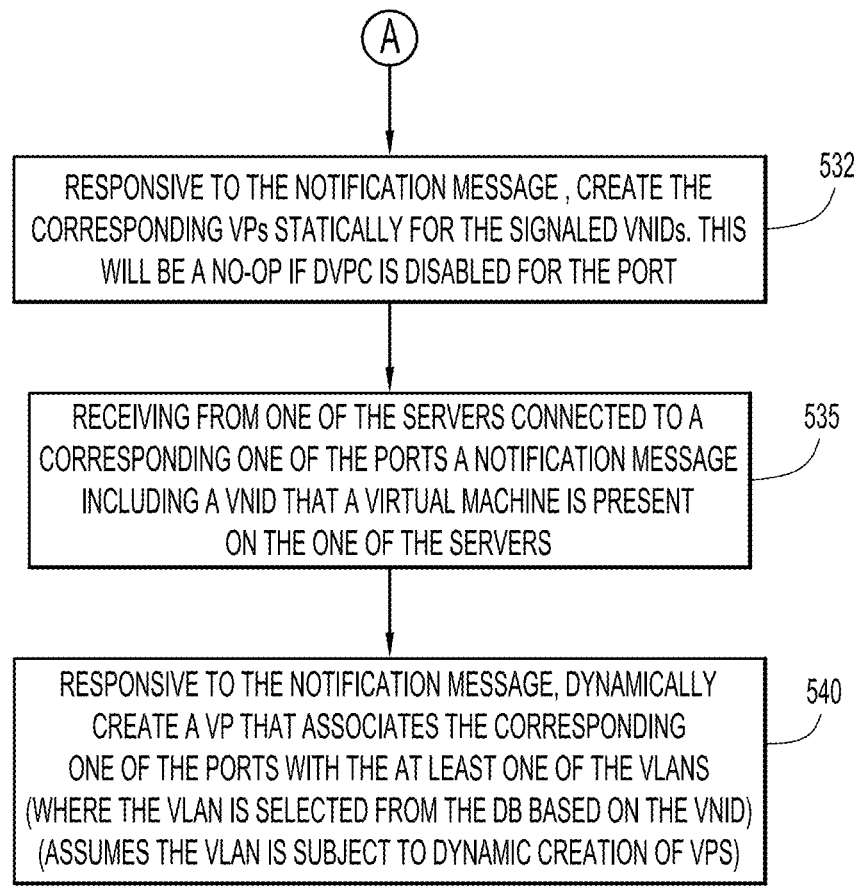

Turning now to FIGS. 5A and 5B, a flowchart of an example method 500 of dynamically and statically creating virtual ports in a leaf switch, e.g., any of leaf switches L1-L4, is depicted. The operations of method 500 are performed by logic 212. The order of operations of method 500 described below is presented as an example only and the order of operations may be permuted in alternative embodiments.

At 505, initially the leaf switch is configured to enable dynamic creation of virtual ports across all ports and all VLANs configured on the leaf switch. This may be considered a default mode for the leaf switch.

At 510, VLANs are configured on the leaf switch.

At 515, the leaf switch maintains database 230 (e.g., database tables 402, 404) that associate VLANs with VNIDs, and that associate VLANs and ports with either dynamic or static virtual port creation (i.e., enable/disable dynamic virtual port creation) on a per VLAN and a per port basis.

At 516, the leaf switch may receive an internal first configuration command from one of modules 302-310 to selectively enable/disable dynamic creation of virtual ports on a per VLAN basis. Responsive to this command, the leaf switch selectively enables/disables dynamic creation of virtual ports, and updates database 230 to reflect the command.

At 517, the leaf switch may receive an internal second configuration command from one of modules 302-310 to selectively enable/disable dynamic creation of virtual ports on a per port basis. Responsive to this command, the leaf switch selectively enables/disables dynamic creation of virtual ports on the indicated ports, and updates database 230 to reflect the command.

At 525, the leaf switch statically creates virtual ports for the VLANs on the ports indicated in database 230 as being associated with static creation of virtual ports (i.e., dynamic creation is disabled/suppressed).

At 531, the leaf switch may receive from one of the servers connected to a corresponding port, an optional notification message, including a list of one or more VNIDs for which Dynamic Virtual Port Creation (DVPC) needs to be disabled/suppressed.

At 532, responsive to the optional notification message received at 531, the leaf switch creates the corresponding VPs statically for the signaled/identified VNIDs (using a VNID-to-VLAN lookup in database 230). This will be a no-op if DVPC is disabled for the port.

At 535, the leaf switch may receive from one of the servers connected to a corresponding one of the ports on the leaf switch a first hop protocol notification message that a virtual machine is present on the one of the servers. The notification message includes a VNID of which the virtual machine is a part.

At 540, responsive to the notification message, the leaf switch determines at least one VLAN associated with the VNID from database 230 (e.g., as indicated in table 402) and dynamically creates a virtual port that associates the corresponding one of the ports with the at least one of the VLANs. This operation assumes that the VLAN is indicated as being subject to dynamic creation of virtual ports in database 230.

Figure 6:
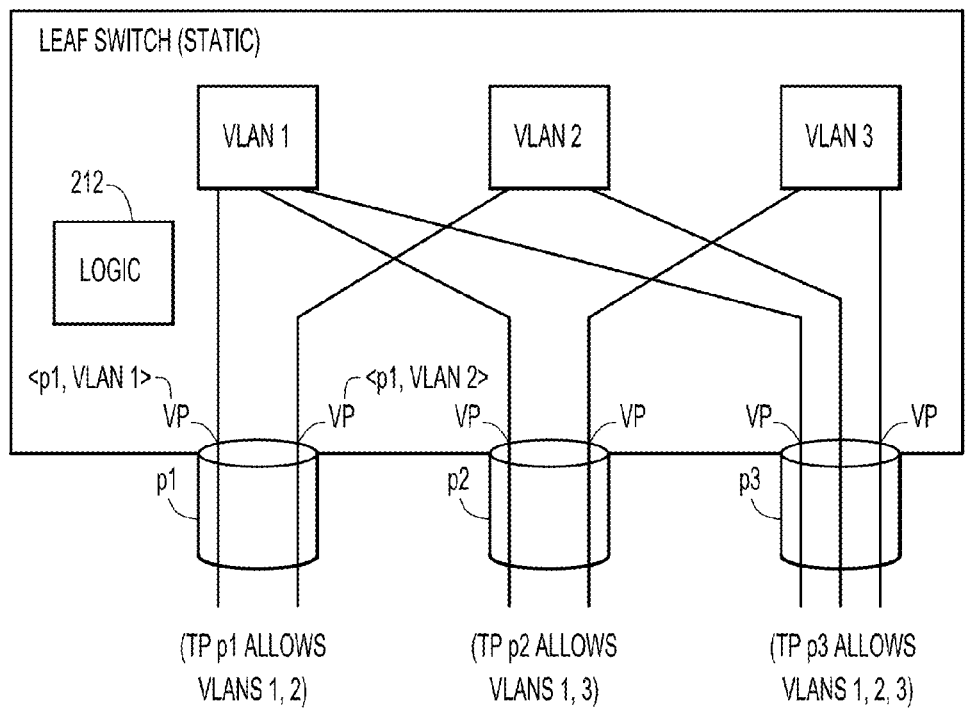
FIG. 6 is an illustration of static virtual port creation on a leaf switch.

With reference to FIG. 6, an illustration of static virtual port creation on a leaf switch is shown. The leaf switch depicted in FIG. 6 includes trunk ports p1, p2, and p3 and VLANs 1-3 configured on the leaf switch. Trunk ports p1, p2, and p3 are respectively configured to allow VLANs (1, 2), VLANs (1, 3), and VLANs (1, 2, 3). Operating in accordance with static creation of virtual ports (VPs), the leaf switch statically creates virtual ports on each of ports p1-p3 for all of the VLANs allowed for the given port.

Figure 7:
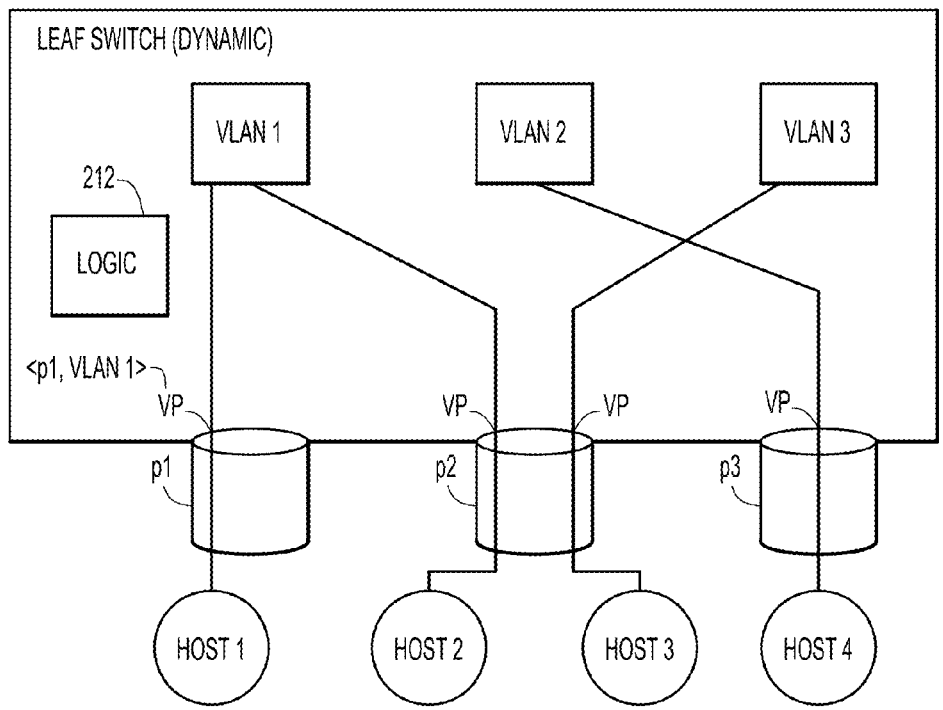
FIG. 7 is an illustration of dynamic virtual port creation on the leaf switch of FIG. 6.

With reference to FIG. 7, there is an illustration of dynamic virtual port creation on the leaf switch of FIG. 6. The Hosts 1-4 depicted in FIG. 7 may represent either servers or virtual machines. Operating in accordance with dynamic creation of virtual ports, although VLANs 1-3 are configured on the leaf switch, the leaf switch only creates virtual ports on a port for a given VLAN (allowed on that port) when requested to do so through the first hop protocol notification message. For example, assume Host1 requests a virtual port on port p1 for VLAN 1. In response, logic 212 creates virtual port <p1, VLAN 1>, through which data traffic may flow between Host1 and the leaf switch. The other virtual ports depicted in FIG. 8 are each dynamically created in a similar manner in response to first hop protocol requests from the respective one of Hosts 2-4.

Figure 8:
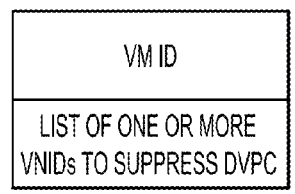
FIG. 8 is a first hop virtual machine notification message sent from a server to a leaf switch.

With reference to FIG. 8, there is shown an example Virtual Network DVPC Disable/Suppress Notification message (TLV) 800 received in operation 531 of method 500. Notification message 800 includes a virtual machine ID and a list of one or more VNIDs to which the message applies.

Techniques provided herein perform dynamic creation of virtual ports on switch in a network on an as needed basis. This conserves switch resources and avoids unnecessary VLAN traffic flooding of ports caused with static creation of virtual ports. The techniques also support dynamic creation of virtual ports with multitenancy in a network.

In summary, in one form, a method is provided, comprising: at a leaf switch of a switch fabric, the leaf switch including multiple ports to connect with respective ones of multiple servers: configuring virtual local area networks (VLANs) on the leaf switch; enabling dynamic creation of virtual ports for at least one of the VLANs on an as needed basis, where a virtual port associates a port with a VLAN; receiving from a particular server connected to a corresponding one of the ports a notification message that a virtual machine is hosted on the particular server; and responsive to the notification message, dynamically creating a virtual port that associates the corresponding one of the ports with the at least one of the VLANs.

The method may further include: maintaining a database that indicates which of the VLANs and the ports are associated with dynamic creation of virtual ports and which of the VLANs and the ports are associated with static creation of virtual ports; statically creating virtual ports for the VLANs on the ports indicated in the database as associated with static creation of virtual ports; and dynamically creating virtual ports for the VLANs on the ports indicated in the database as associated with dynamic creation of virtual ports.

The method may further include receiving from one of the servers a message to disable dynamic creation of virtual ports for a list of one or more Virtual Network Identifiers; and in response to the message, statically creating virtual ports for the VLANs on the port connected to the server from which the message was received.

The notification message may include a Virtual Network Identifier (VNID) of a virtual network of which the virtual machine is a part, and the method may further comprise: selecting at least one of the VLANs based on the virtual network ID, wherein the dynamically creating includes dynamically creating a virtual port that associates one of the ports with the selected at least one of the VLANs.

The method may further include: selectively enabling the dynamic creation of virtual ports on a per VLAN basis responsive to a configuration command to control the dynamic creation of virtual ports on a per VLAN basis; and updating a database that indicates which of the VLANs are associated with dynamic creation of virtual ports and which of the VLANs are associated with static creation of virtual ports based on the configuration command.

The method may further include enabling dynamic creation of virtual ports across all of the VLANs by default, and updating a database that indicates which of the VLANs are associated with dynamically creation of virtual ports and which of the VLANs are associated with static creation of virtual ports to reflect the enabling by default.

The method may further include: maintaining a database that indicates which ones of known virtual networks are associated with dynamic creation of virtual ports and which of the known virtual networks are associated with static creation of virtual ports; controlling dynamic creation of virtual ports on a per virtual network basis based on the database by default; and controlling dynamic creation of virtual ports on a per virtual network basis based on a message received from one of the servers instead of the database if the message identifies one of the known virtual networks and indicates whether to perform one of enabling and disabling dynamic creation of virtual ports for the identified virtual network.

The method may further include: selectively disabling dynamic creation of virtual ports on a per port basis responsive to a configuration command to control the dynamic creation of virtual ports for the port; and updating a database that indicates which of the ports are associated with dynamic creation of virtual ports and which of the ports are associated with static creation of virtual ports based on the configuration command.

In another form, an apparatus is provided, comprising: a network interface unit of a leaf switch in a switch fabric, the network interface unit including multiple ports to connect with respective ones of multiple servers; and a processor coupled to the network interface unit, and configured to: configure virtual local area networks (VLANs) on the leaf switch; enable dynamic creation of virtual ports for at least one of the VLANs on an as needed basis, where a virtual port associates a port with a VLAN; receive from a particular server connected to a corresponding one of the ports a notification message that a virtual machine is hosted on the particular server; and responsive to the notification message, dynamically create a virtual port that associates the corresponding one of the ports with the at least one of the VLANs.

In still another form, a processor readable medium is provided for storing instructions that, when executed by a processor, cause the processor to: configure virtual local area networks (VLANs) on a leaf switch of a switch fabric including multiple ports to connect with respective ones of multiple servers; enable dynamic creation of virtual ports for at least one of the VLANs on an as needed basis, where a virtual port associates a port with a VLAN; receive from a particular server connected to a corresponding one of the ports a notification message that a virtual machine is hosted on the particular server; and responsive to the notification message, dynamically create a virtual port that associates the corresponding one of the ports with the at least one of the VLANs.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at a leaf switch of a switch fabric, the leaf switch including multiple ports to connect with respective ones of multiple servers:
   configuring virtual local area networks (VLANs) on the leaf switch;
   maintaining a database that associates ports and VLANs on the leaf switch with dynamic or static creation of a virtual port on a per port and a per VLAN basis, where a virtual port associates a port with a VLAN;
   enabling dynamic creation of virtual ports for at least one of the VLANs by configuring the database with port flags that indicate whether each port is enabled for either dynamic or static creation of virtual ports, and VLAN flags that indicate whether each VLAN is enabled for either dynamic or static creation of virtual ports;
   after the enabling, receiving from a particular server connected to a corresponding one of the ports a notification message that a virtual machine is hosted on the particular server; and
   responsive to the notification message, dynamically creating a virtual port that associates the corresponding one of the ports with the at least one of the VLANs based on whether the one of the ports and the at least one of the VLANs are indicated as being enabled for dynamic creation of virtual ports via respective ones of the port flags and the VLAN flags.

2. The method of claim 1, further comprising, at the leaf switch:
statically creating virtual ports for the VLANs on the ports indicated in the database as enabled for static creation of virtual ports; and
dynamically creating virtual ports for the VLANs on the ports indicated in the database as enabled for dynamic creation of virtual ports.

3. The method of claim 1, further comprising, at the leaf switch:
receiving from one of the servers a message to disable dynamic creation of virtual ports for a list of one or more Virtual Network Identifiers; and
in response to the message, statically creating virtual ports for the VLANs on the port connected to the server from which the message was received.

4. The method of claim 1, wherein the notification message includes a Virtual Network Identifier (VNID) of a virtual network of which the virtual machine is a part, the method further comprising:
selecting at least one of the VLANs based on the virtual network ID,
wherein the dynamically creating includes dynamically creating a virtual port that associates one of the ports with the selected at least one of the VLANs.

5. The method of claim 1, wherein the enabling includes selectively enabling the dynamic creation of virtual ports on a per VLAN basis responsive to a configuration command to control the dynamic creation of virtual ports on a per VLAN basis, and further comprising:
updating the VLAN flags that indicate which of the VLANs are enabled for dynamic creation of virtual ports and which of the VLANs are enabled for static creation of virtual ports based on the configuration command.

6. The method of claim 1, wherein the enabling includes enabling dynamic creation of virtual ports across all of the VLANs by default, and further comprising:
updating the VLAN flags that indicate which of the VLANs are enabled for dynamically creation of virtual ports and which of the VLANs are enabled for static creation of virtual ports to reflect the enabling by default.

7. The method of claim 1, further comprising, at the leaf switch:
controlling dynamic creation of virtual ports on a per virtual network basis based on the database by default; and
controlling dynamic creation of virtual ports on a per virtual network basis based on a message received from one of the servers instead of the database if the message identifies one of the known virtual networks and indicates whether to perform one of enabling and disabling dynamic creation of virtual ports for the identified virtual network.

8. The method of claim 1, further comprising, at the leaf switch:
selectively disabling dynamic creation of virtual ports on a per port basis responsive to a configuration command to control the dynamic creation of virtual ports for the port; and
updating the port flags that indicate which of the ports are enabled for dynamic creation of virtual ports and which of the ports are enabled for static creation of virtual ports based on the configuration command.

9. The method of claim 1, wherein maintaining includes maintaining a database including a first table that associates ports on the leaf switch with dynamic or static creation of a virtual port and a second table that associates VLANs on the leaf switch with dynamic or static creation of a virtual port.

10. An apparatus comprising:
a network interface unit of a leaf switch in a switch fabric, the network interface unit including multiple ports to connect with respective ones of multiple servers; and
a processor coupled to the network interface unit, and configured to:
configure virtual local area networks (VLANs) on the leaf switch;
maintain a database that associates ports and VLANs on the leaf switch with dynamic or static creation of a virtual port on a per port and a per VLAN basis, where a virtual port associates a port with a VLAN;
enable dynamic creation of virtual ports for at least one of the VLANs by configuring the database with port flags that indicate whether each port is enabled for either dynamic or static creation of virtual ports, and VLAN flags that indicate whether each VLAN is enabled for either dynamic or static creation of virtual ports;
after the enable operation, receive from a particular server connected to a corresponding one of the ports a notification message that a virtual machine is hosted on the particular server; and
responsive to the notification message, dynamically create a virtual port that associates the corresponding one of the ports with the at least one of the VLANs based on whether the one of the ports and the at least one of the VLANs are indicated as being enabled for dynamic creation of virtual ports via respective ones of the port flags and the VLAN flags.

11. The apparatus of claim 10, wherein the processor is further configured to:
statically create virtual ports for the VLANs on the ports indicated in the database as enabled for static creation of virtual ports; and
dynamically create virtual ports for the VLANs on the ports indicated in the database as enabled for dynamic creation of virtual ports.

12. The apparatus of claim 10, wherein the processor is further configured to:
receive from one of the servers a message to disable dynamic creation of virtual ports for a list of one or more Virtual Network Identifiers; and
in response to the message, statically create virtual ports for the VLANs on the port connected to the server from which the message was received.

13. The apparatus of claim 10, wherein the notification message includes a Virtual Network Identifier (VNID) of a virtual network of which the virtual machine is a part, and wherein the processor is further configured to:
select at least one of the VLANs based on the virtual network ID,
wherein the processor is configured to dynamically create dynamically creating a virtual port that associates one of the ports with the selected at least one of the VLANs.

14. The apparatus of claim 10, wherein the processor is further configured to:

selectively enable the dynamic creation of virtual ports on a per VLAN basis responsive to a configuration command to control the dynamic creation of virtual ports on a per VLAN basis; and update the VLAN flags that indicate which of the VLANs are enabled for dynamic creation of virtual ports and which of the VLANs are enabled for static creation of virtual ports based on the configuration command.

15. The apparatus of claim 10, wherein the processor is further configured to:
    enable dynamic creation of virtual ports across all of the VLANs by default; and
    update the VLAN flags that indicate which of the VLANs are enabled for dynamically creation of virtual ports and which of the VLANs are enabled for static creation of virtual ports to reflect the enabling by default.

16. The apparatus of claim 10, wherein the processor is further configured to:
    control dynamic creation of virtual ports on a per virtual network basis based on the database by default; and
    control dynamic creation of virtual ports on a per virtual network basis based on a message received from one of the servers instead of the database if the message identifies one of the known virtual networks and indicates whether to perform one of enabling and disabling dynamic creation of virtual ports for the identified virtual network.

17. The apparatus of claim 10, wherein the processor is further configured to:
    maintain a database including a first table that associates ports on the leaf switch with dynamic or static creation of a virtual port and a second table that associates VLANs on the leaf switch with dynamic or static creation of a virtual port.

18. A non-transitory tangible processor readable medium storing instructions that, when executed by a processor, cause the processor to:
    configure virtual local area networks (VLANs) on a leaf switch of a switch fabric, the leaf switch having multiple ports to connect with respective ones of multiple servers;
    maintain a database that associates ports and VLANs on the leaf switch with dynamic or static creation of a virtual port on a per port and a per VLAN basis, where a virtual port associates a port with a VLAN;
    enable dynamic creation of virtual ports for at least one of the VLANs by configuring the database with port flags that indicate whether each port is enabled for either dynamic or static creation of virtual ports, and VLAN flags that indicate whether each VLAN is enabled for either dynamic or static creation of virtual ports;
    after the enable operation, receive from a particular server connected to a corresponding one of the ports a notification message that a virtual machine is hosted on the particular server; and
    responsive to the notification message, dynamically create a virtual port that associates the corresponding one of the ports with the at least one of the VLANs based on whether the one of the ports and the at least one of the VLANs are indicated as being enabled for dynamic creation of virtual ports via respective ones of the port flags and the VLAN flags.

19. The processor readable medium of claim 18, further comprising instructions to cause the processor to:

statically create virtual ports for the VLANs on the ports indicated in the database as enabled for static creation of virtual ports; and dynamically create virtual ports for the VLANs on the ports indicated in the database as enabled for dynamic creation of virtual ports.

20. The processor readable medium of claim 18, further comprising instructions to cause the processor to:
    receive from one of the servers a message to disable dynamic creation of virtual ports for a list of one or more Virtual Network Identifiers; and
    in response to the message, statically create virtual ports for the VLANs on the port connected to the server from which the message was received.

21. The processor readable medium of claim 18, wherein the notification message includes a Virtual Network Identifier (VNID) of a virtual network of which the virtual machine is a part, and wherein instructions include further instructions to cause the processor to:
    select at least one of the VLANs based on the virtual network ID,
    dynamically create dynamically creating a virtual port that associates one of the ports with the selected at least one of the VLANs.

22. The processor readable medium of claim 18, further comprising instructions to cause the processor to:
    selectively enable the dynamic creation of virtual ports on a per VLAN basis responsive to a configuration command to control the dynamic creation of virtual ports on a per VLAN basis; and
    update the VLAN flags that indicate which of the VLANs are enabled for dynamic creation of virtual ports and which of the VLANs are enabled for static creation of virtual ports based on the configuration command.

23. The processor readable medium of claim 18, further comprising instructions to cause the processor to:
    enable dynamic creation of virtual ports across all of the VLANs by default; and
    update the VLAN flags that indicate which of the VLANs are associated with dynamically creation of virtual ports and which of the VLANs are associated with static creation of virtual ports to reflect the enabling by default.

24. The processor readable medium of claim 18, further comprising instructions to cause the processor to:
    control dynamic creation of virtual ports on a per virtual network basis based on the database by default; and
    control dynamic creation of virtual ports on a per virtual network basis based on a message received from one of the servers instead of the database if the message identifies one of the known virtual networks and indicates whether to perform one of enabling and disabling dynamic creation of virtual ports for the identified virtual network.

25. The processor readable medium of claim 18, wherein the instructions include further instructions to cause the processor to:
    maintain a database including a first table that associates ports on the leaf switch with dynamic or static creation of a virtual port and a second table that associates VLANs on the leaf switch with dynamic or static creation of a virtual port.

* * * * *